US008354480B2

(12) United States Patent
McAuliffe et al.

(10) Patent No.: US 8,354,480 B2
(45) Date of Patent: Jan. 15, 2013

(54) AQUEOUS SILICONE EMULSION FOR IMPARTING WATER REPELLENCY

(75) Inventors: Anthony S. McAuliffe, New South Wales (AU); Marie-Jose Sarrazin, Waterloo (BE); David Brian Selley, Auburn, MI (US); Andreas Stammer, Pont-A-Celles (BE)

(73) Assignees: Dow Corning Corporation, Midland, MI (US); Dow Corning Australia Pty Ltd, New South Wales (AU)

( * ) Notice: Subject to any disclaimer, the term of this patent is extended or adjusted under 35 U.S.C. 154(b) by 0 days.

(21) Appl. No.: 12/597,313

(22) PCT Filed: Apr. 16, 2008

(86) PCT No.: PCT/US2008/060429
§ 371 (c)(1),
(2), (4) Date: Jul. 8, 2010

(87) PCT Pub. No.: WO2008/134243
PCT Pub. Date: Nov. 6, 2008

(65) Prior Publication Data
US 2010/0292389 A1     Nov. 18, 2010

Related U.S. Application Data

(60) Provisional application No. 60/926,385, filed on Apr. 26, 2007.

(51) Int. Cl.
C08L 83/06    (2006.01)
(52) U.S. Cl. .............. 525/477; 516/53; 516/76
(58) Field of Classification Search .......... 524/588
See application file for complete search history.

(56) References Cited

U.S. PATENT DOCUMENTS

| | | | | |
|---|---|---|---|---|
| 3,355,406 A * | 11/1967 | Cekada, Jr. | ............... | 524/263 |
| 4,325,852 A * | 4/1982 | Hallenbeck | ............... | 523/334 |
| 4,559,227 A | 12/1985 | Chandra et al. | | |
| 4,636,407 A * | 1/1987 | Comper et al. | ............... | 427/133 |
| 4,778,624 A | 10/1988 | Ohashi et al. | | |
| 4,929,703 A | 5/1990 | Narula et al. | | |
| 5,000,861 A * | 3/1991 | Yang | ............... | 428/391 |
| 5,152,950 A * | 10/1992 | Ona et al. | ............... | 264/315 |
| 5,247,043 A * | 9/1993 | Nakashima | ............... | 528/14 |
| 5,300,327 A * | 4/1994 | Stark-Kasley et al. | ............... | 427/387 |
| 5,326,483 A | 7/1994 | Halloran et al. | | |
| 5,536,537 A * | 7/1996 | Mizushima et al. | ............... | 427/387 |
| 5,695,551 A * | 12/1997 | Buckingham et al. | ............... | 106/2 |
| 5,919,296 A | 7/1999 | Be et al. | | |
| 6,319,980 B1 | 11/2001 | Ishikawa et al. | | |
| 6,323,268 B1 | 11/2001 | Fisher et al. | | |
| 6,638,572 B1 * | 10/2003 | Inglefield | ............... | 427/376.2 |
| 7,022,799 B2 | 4/2006 | Dai et al. | | |
| 2003/0166756 A1 * | 9/2003 | Hasegawa et al. | ............... | 524/425 |

FOREIGN PATENT DOCUMENTS

| | | |
|---|---|---|
| CN | 1454919 A | 11/2003 |
| JP | 2286748 A | 11/1990 |
| JP | 6-134769 | * 5/1994 |
| JP | 7251124 A | 10/1995 |
| JP | 2000129129 A | 5/2000 |
| JP | 2004502017 A | 1/2004 |

OTHER PUBLICATIONS

Abstract for 06-134769 (May 1994).*
PCT International Search Report for PCT/US2008/060429, dated Jul. 4, 2008, 3 pages.
English language abstract not available for CN 1454919. However, see English language equivalent US 7022799. Original document extracted from the espacenet.com database on Nov. 8, 2011, 32 pages.
English language abstract for JP 7251124, dated Nov. 26, 1990, 2 pages.
English language abstract for JP 2000129129, dated May 5, 2009, 2 pages.
English language abstract for JP 2004502017, dated Jan. 22, 2004, 1 page.

* cited by examiner

*Primary Examiner* — Marc Zimmer
(74) *Attorney, Agent, or Firm* — Howard & Howard Attorneys PLLC

(57) ABSTRACT

Aqueous silicone emulsions are disclosed containing a phenyl silsesquioxane resin, an alkoxysilane, a hydroxy terminated polydialkylsiloxane, and an emulsion of an aminofunctional polysiloxane. The silicone emulsions are useful for imparting water repellency to various surfaces, and in particular, inorganic building surfaces.

12 Claims, No Drawings

AQUEOUS SILICONE EMULSION FOR IMPARTING WATER REPELLENCY

RELATED APPLICATIONS

This application claims priority to and all the advantages of International Patent Application No. PCT/US2008/060429, filed on Apr. 16, 2008, which claims priority to U.S. Provisional Patent Application No. 60/926,385, filed on Apr. 26, 2007.

TECHNICAL FIELD

This disclosure relates to aqueous silicone emulsions containing a phenyl silsesquioxane resin, an alkoxysilane, a hydroxy terminated polydialkylsiloxane, an emulsifier, and an emulsion of an aminofunctional polysiloxane. The silicone emulsions are useful for imparting water repellency to various surfaces, such as inorganic building surfaces.

BACKGROUND

Aqueous silicone emulsions are used to provide water repellent coatings on various building surfaces. These emulsions are either used directly on the surface, or as additives in coating formulations or paints. Various silicone based components have been formulated into such emulsions. A long standing problem with silicone emulsions based coatings has been to identify storage and dilution stable emulsions that provide waterproof coatings on a variety of surfaces. For example, there are many teachings of silicone emulsions containing silicone resins, alkoxysilanes, and combinations thereof in attempts to balance storage stability with waterproofing action on a variety of surfaces. In general, emulsions of pre-formed silicone resins have good stability, and provide waterproofing on the outermost surface of building materials. However, emulsions of silicone resins often lack sufficient waterproofing abilities on most porous surfaces because of insufficient penetration beyond the surface. This problem may be overcome by using an alkoxysilane in the emulsion. The alkoxysilane after penetrating into various surfaces upon application from the emulsion, can react to form a resinous waterproof coating. However, alkoxysilanes are limited to only those surfaces that will enhance resin formation from the alkoxysilanes (such as alkaline surfaces). Also, emulsions or aqueous based formulations containing alkoxysilanes often have limited storage stability because of the reactivity of the alkoxy groups. Certain combinations of pre-formed silicone resins and alkoxy resins are also known, representing attempts to combine the benefits of each component. However, a need still exists to identify storage and dilution stable silicone emulsions that provide coatings that impart water repellency to a variety of building surfaces. Furthermore, there is a need to identify such emulsions that comply with stringent VOC (Volatile Organic Content) governmental regulations in many regions.

The present inventors have discovered certain aqueous silicone emulsions that are storage and dilution stable, yet provide water repellent coatings on a variety of substrates. The aqueous silicone emulsions may also be considered as low VOC formulations.

SUMMARY

This disclosure relates to an aqueous silicone emulsion composition comprising;
A) a phenyl silsesquioxane resin,
B) an alkoxysilane,
C) a hydroxy terminated polydialkylsiloxane,
D) an emulsifier, and
E) an emulsion of an aminofunctional polysiloxane.

The present disclosure also provides a process for preparing aqueous silicone emulsions and compositions further containing the aqueous silicone emulsions. The emulsions and compositions containing them are useful to impart water repellency to a variety of surfaces, and in particular, inorganic building surfaces.

DETAILED DESCRIPTION

A) The Phenyl Silsesquioxane Resin

Component (A) in the aqueous silicone emulsion of the present disclosure is a phenyl silsesquioxane resin, or a mixture of phenyl silsesquioxanes. As used herein, a phenyl silsesquioxane resin is an organopolysiloxane having at least one siloxy unit of the formula ($C_6H_5SiO_{3/2}$). Organopolysiloxanes are polymers containing siloxy units independently selected from ($R_3SiO_{1/2}$), ($R_2SiO_{2/2}$), ($RSiO_{3/2}$), or ($SiO_{4/2}$) siloxy units (also referred herein as M, D, T, or Q units respectively), where R may be any monovalent organic group. These siloxy units can be combined in various manners to form cyclic, linear, or branched structures. The chemical and physical properties of the resulting polymeric structures can vary. For example, organopolysiloxanes can be volatile or low viscosity fluids, high viscosity fluids/gums, elastomers or rubbers, and resins, depending on the selection and amount of each siloxy unit in the organopolysiloxane. Silsesquioxanes are typically characterized as having at least one or several ($RSiO_{3/2}$) or T siloxy units. Thus, the organopolysiloxanes suitable as component A) in the present disclosure may have any combination of ($R_3SiO_{1/2}$), ($R_2SiO_{2/2}$), ($RSiO_{3/2}$), or ($SiO_{4/2}$) siloxy units, providing it has at least one siloxy unit of the formula ($C_6H_5SiO_{3/2}$), where $C_6H_5$ represents a phenyl group.

The phenyl silsesquioxane resin may have an average formula comprising at least 40 mole % of siloxy units having the formula $(R'_2SiO_{2/2})_x(C_6H_5SiO_{3/2})_y$, where x and y have a value of 0.05 to 0.95, and R" is a monovalent hydrocarbon group having 1 to 8 carbon atoms. As used herein, x and y represent the mole fraction of ($R'_2SiO_{2/2}$) and ($C_6H_5SiO_{3/2}$) siloxy units (i.e. D and T-phenyl siloxy units) relative to each other present in the phenyl silsesquioxane resin. Thus, the mole fractions of ($R'_2SiO_{2/2}$) and ($C_6H_5SiO_{3/2}$) siloxy units each can independently vary from 0.05 to 0.95. However, the combination of ($R'_2SiO_{2/2}$) and ($C_6H_5SiO_{3/2}$) siloxy units present must total at least 40 mole %, alternatively 80 mole %, or alternatively 95 mole % of all siloxy units present in the phenyl silsesquioxane resin.

R' can be a linear or branched alkyl such as ethyl, propyl, butyl, pentyl, hexyl, heptyl, or octyl group. Typically, R' is methyl.

The phenyl silsesquioxane resins can contain additional siloxy units such as (i) $(R^1_3SiO_{1/2})_a$, (ii) $(R^2_2SiO_{2/2})_b$, (iii) $(R^3SiO_{3/2})_c$, or (iv) $(SiO_{4/2})_d$ units which are commonly known in the art, and also used herein, as M, D, T, and Q units respectively. The amount of each unit present in the phenyl silsesquioxane resin can be expressed as a mole fraction of the total number of moles of all siloxy units present in the phenyl silsesquioxane resin. Thus, the phenyl silsesquioxane resin of the present invention can comprise the units:
(i) $(R^1_3SiO_{1/2})_a$,
(ii) $(R^2_2SiO_{2/2})_b$,
(iii) $(R^3SiO_{3/2})_c$,
(iv) $(SiO_{4/2})_d$,
(v) $(R'_2SiO_{2/2})_x$ and
(vi) $(C_6H_5SiO_{3/2})_y$, wherein R$^1$, R$^2$, and R$^3$ are independently an alkyl group having from 1 to 8 carbon atoms, an aryl group, or a carbinol group, R' is a monovalent hydrocarbon group having 1-8 carbon atoms, a, b, c, and d have value of zero to 0.6, x and y each have a value of 0.05 to 0.95, with the provisos that the value of x+y is equal to or greater than 0.40, and the value of a+b+c+d+x+y=1.

The R$^1$, R$^2$, and R$^3$ in the units of the phenyl silsesquioxane resin are independently an alkyl group having from 1 to 8 carbon atoms, an aryl group, a carbinol group, or an amino group. The alkyl groups are illustrated by methyl, ethyl, propyl, butyl, pentyl, hexyl, and octyl. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl.

For the purposes of this invention a "carbinol group" is defined as any group containing at least one carbon-bonded hydroxy (COH) group. Thus the carbinol groups may contain more than one COH radical such as for example

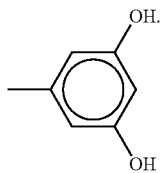

The carbinol group if free of aryl groups has at least 3 carbon atoms, or an aryl-containing carbinol group having at least 6 carbon atoms. The carbinol group free of aryl groups having at least 3 carbon atoms is illustrated by groups having the formula R$^4$OH wherein R$^4$ is a divalent hydrocarbon radical having at least 3 carbon atoms or divalent hydrocarbonoxy radical having at least 3 carbon atoms. The group R$^4$ is illustrated by alkylene radicals such as —(CH$_2$)$_x$— where x has a value of 3 to 10, —CH$_2$CH(CH$_3$)—, —CH$_2$CH(CH$_3$)CH$_2$—, —CH$_2$CH$_2$CH(CH$_2$CH$_3$)CH$_2$CH$_2$CH$_2$—, and —OCH(CH$_3$)(CH$_2$)$_x$— wherein x has a value of 1 to 10.

The aryl-containing carbinol group having at least 6 carbon atoms is illustrated by groups having the formula R$^5$OH wherein R$^5$ is an arylene radical such as —(CH$_2$)$_x$C$_6$H$_4$— wherein x has a value of 0 to 10, —CH$_2$CH(CH$_3$)(CH$_2$)$_x$C$_6$H$_4$— wherein x has a value of 0 to 10, —(CH$_2$)$_x$C$_6$H$_4$(CH$_2$)$_x$— wherein x has a value of 1 to 10. The aryl-containing carbinol groups typically have from 6 to 14 atoms.

Typically, R$^1$ is a methyl group, R$^2$ is a methyl or phenyl group, and R$^3$ is a methyl group.

Any individual D, T or Q siloxane units of the phenyl silsesquioxane resins can also contain a hydroxy group and/or alkoxy group. Such siloxane units containing hydroxy and/or alkoxy groups are commonly found in siloxane resins having the general formula R$_n$SiO$_{(4-n)/2}$. The hydroxy groups in these siloxane resins typically result from the reaction of the hydrolyzable group on the siloxane unit with water. The alkoxy groups result from incomplete hydrolysis when alkoxysilane precursors are used or from exchange of alcohol with hydrolyzable groups. Typically, the weight percent of the total hydroxy groups present in the phenyl silsesquioxane resin is up to 40 wt %.

The molecular weights of the phenyl silsesquioxane resins are not restricted, but typically the number average molecular weight (M$_N$) range from 500 to 10,000, or alternatively from 500 to 2,000.

The viscosity of the phenyl silsesquioxane at 25° C. is not restricted, but typically the viscosity should be lower than 100 cP, alternatively range from 10 cP to 50 cP. A phenyl silsequixoane having a higher viscosity in the aqueous silicone emulsion may not be as readily coated on a substrate. However, resins having a higher viscosity at 25° C. may be used if dissolved in a solvent, as described below as solvents for their preparation.

The phenyl silsesquioxane resins of the present disclosure may be prepared by any method known in the art for preparing siloxane resins having the general formula R$_n$SiO$_{(4-n)/2}$ where R is an alkyl or aryl group and n is generally less than 1.8. Thus, the phenyl silsesquioxane resins can be prepared by co-hydrolyzing at least one phenylsilane having three hydrolyzable groups such as a halogen or alkoxy group present in the silane molecule with other selected alkylsilanes having two or three hydrolyzable groups such as a halogen or alkoxy group present in the silane molecule. For example, the phenyl silsesquioxane resins can be obtained by co-hydrolyzing alkoxysilanes, such as dimethyldiethoxysilane with phenyltrimethoxysilane, phenyltriethoxysilane, or phenyltripropoxysilane. Alternatively, alkylchlorosilanes may be co-hydrolyzed with phenyltrichlorosilane to produce the phenyl silsesquioxane resins of the present invention. Typically, the co-hydrolysis is performed in an alcohol or hydrocarbon solvent. Alcohols suitable for these purposes include methanol, ethanol, n-propyl alcohol, isopropyl alcohol, butanol, methoxy ethanol, ethoxy ethanol, or similar alcohols. Examples of hydrocarbon-type solvents which can also be concurrently used include toluene, xylene, or similar aromatic hydrocarbons; hexane, heptane, isooctane, or similar linear or partially branched saturated hydrocarbons; and cyclohexane, or similar aliphatic hydrocarbons.

The additional M, D, T, and Q units, as described supra, can be introduced into the phenyl silsesquioxane resins by reacting an additional organosilane(s), selected to produce the desired siloxy unit in the resulting resin during the co-hydrolysis of the alkylsilane and phenylsilane. For example, reacting methoxytrimethylsilane, dimethoxydimethylsilane, trimethoxymethylsilane, tetramethoxysilane (or alternatively the corresponding ethoxy or chlorosilane of each) will respectively introduce a M, D, T, or Q unit into the alkylphenyl silsesquioxane resin. The amount of these additional silanes present in the co-hydrolysis reaction are selected to meet the mole fraction definitions, as described supra.

Alternatively, the phenyl silsesquioxane resins can be prepared by reacting an organopolysiloxane and a phenyl silsesquioxane resin using any method in the art known to effect reaction of M, D, T, and Q siloxane units. For example, an diorganopolysiloxane and a phenyl silsesquioxane resin can be reacted by a condensation reaction in the presence of a catalyst. Typically the starting resins are contained in an aromatic hydrocarbon or siloxane solvent. Suitable condensation reaction catalysts are base catalysts including metal hydroxides such as potassium hydroxide and sodium hydroxide; metal salts such as silanolates, carboxylates, and carbonates; ammonia; amines; and titanates such as tetrabutyl titanates; and combinations thereof. Typically, the reaction of siloxane resins is affected by heating the reaction mixture to temperatures ranging from 50 to 140° C., alternatively 100 to 140° C. The reaction can be conducted in a batch, semi-continuous, or continuous process.

The phenyl silsesquioxane resins of this invention are illustrated by phenyl silsesquioxane resins comprising the units;

$((CH_3)_2SiO_{3/2})_x(C_6H_5SiO_{3/2})_y$ wherein x and y each have a value of 0.05 to 0.95,
with the provisos that the value of x+y is equal to or greater than 0.40.

Optionally, the phenyl silsesquioxane resin can be dissolved in a solvent. A volatile siloxane or organic solvent can be selected as optional component for dissolving or dispersing the phenyl silsesquioxane resin before addition to the aqueous emulsion composition. Any volatile siloxane or organic solvent can be selected providing component A) is dispersible or miscible with the selected solvent. The volatile siloxane solvent can be a cyclic polysiloxane, a linear polysiloxane, or mixtures thereof. Some representative volatile linear polysiloxanes are hexamethyldisiloxane, octamethyltrisiloxane, decamethyltetrasiloxane, tetradecamethylhexasiloxane, and hexadecamethylheptasiloxane. Some representative volatile cyclic polysiloxanes are hexamethylcyclotrisiloxane, octamethylcyclotetrasiloxane, decamethylcyclopentasiloxane, and dodecamethylcyclohexasiloxane. The organic solvent can be an ester, an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, an acetate, such as ethyl acetate or butyl acetate, a halogenated hydrocarbon such as dichloromethane, 1,1,1-trichloroethane or methylene chloride, chloroform, dimethyl sulfoxide, dimethyl formamide, acetonitrile, tetrahydrofuran, or an aliphatic hydrocarbon such as white spirits, mineral spirits, isododecane, heptane, hexane or naphtha.

Commercially available phenyl silsesquioxane resins that are suitable as component A) in silicone emulsions as presently disclosed include the following representative, non-limiting examples; DOW CORNING® 3037 Intermediate, DOW CORNING® 3074, and (Dow Corning Corp., Midland, Mich.).

B) The Alkoxysilane

The alkoxysilane can constitute a single alkoxysilane or a mixture of alkoxysilanes can be employed. The alkoxysilane may have the formula $R^8_aSi(OR^9)_{(4-a)}$. In the formula, $R^8$ represents an alkyl group having 1-30 carbon atoms, alternatively 1-12 carbon atoms, an aryl group such as phenyl, or an haloalkyl group such as chloropropyl and trifluoropropyl. The value of a is 1 or 2, and $R^9$ represents an alkyl group having 1-6 carbon atoms. Typically, $R^8$ is n-octyl, and $R^9$ is methyl or ethyl.

Some suitable alkoxysilanes are methyltrimethoxysilane, methyltriethoxysilane, methyltripropoxysilane, ethyltrimethoxysilane, ethyltributoxysilane, propyltrimethoxysilane, propyltriethoxysilane, isobutyltrimethoxysilane, isobutyltriethoxysilane, butyltriethoxysilane, hexyltrimethoxysilane, n-octyltriethoxysilane, dimethyldimethoxysilane, dimethyldiethoxysilane, diethyldimethoxysilane, diisobutyldimethoxysilane, phenyltrimethoxysilane, dibutyldiethoxysilane, and dihexyldimethoxysilane.

Such alkoxysilanes are commercially available from the Dow Corning Corporation, Midland, Mich., and are described, for example, in U.S. Pat. No. 5,300,327 (Apr. 5, 1994), U.S. Pat. No. 5,695,551 (Dec. 9, 1997), and U.S. Pat. No. 5,919,296 (Jul. 6, 1999).

C) The Hydroxy Terminated Polydialkylsiloxane

The emulsions of the present invention contain a hydroxy terminated polydialkylsiloxane. Thus, component C) is a polydialkylsiloxane having the general formula;

$[R^9_2Si(OH)O_{1/2}][R^9_2SiO_{2/2}]_z[SiR^9_2(OH)O_{1/2}]$ where $R^9$ is as defined above and z represents the degree of polymerization and is greater than one. Typically, the hydroxy terminated polydialkylsiloxane is a hydroxy terminated polydimethylsiloxane having a degree of polymerization (z) that is greater than 1, alternatively from 1 to 500, alternatively, from 5 to 200, or alternatively from 10 to 100.

D) The Emulsifier

Component D) is an emulsifier. As used herein, an "emulsifier" means any surfactant or mixture of surfactants having the ability to stabilize an aqueous emulsion. The surfactant may be an anionic surfactant, cationic surfactant, nonionic surfactant, amphoteric surfactant, or a mixture of surfactants. Nonionic surfactants and anionic surfactants are typically used and mixtures containing two nonionic surfactants are also typically used. When mixtures containing nonionic surfactants are used, one nonionic surfactant should have a low Hydrophile-Lipophile Balance (HLB) and the other nonionic surfactant should have a high HLB, such that the two nonionic surfactants have a combined HLB of 11-15, preferably a combined HLB of 12.5-14.5.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates. One example of a preferred anionic surfactant is sold commercially under the name Bio-Soft N-300. It is a triethanolamine linear alkylate sulphonate composition marketed by the Stephan Company, Northfield, Ill.

Representative examples of suitable cationic surfactants include alkylamine salts, quaternary ammonium salts, sulphonium salts, and phosphonium salts. Representative examples of suitable nonionic surfactants include condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, and fatty amine oxides. Representative examples of suitable amphoteric surfactants include imidazoline compounds, alkylaminoacid salts, and betaines.

Representative examples of suitable commercially available nonionic surfactants include polyoxyethylene fatty alcohols sold under the tradename BRIJ by Uniqema (ICI Surfactants), Wilmington, Del. Some examples are BRIJ 35 Liquid, an ethoxylated alcohol known as polyoxyethylene (23) lauryl ether, and BRIJ 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL® 15-S-5, TERGITOL® 15-S-12, TERGITOL® 15-S-15, and TERGITOL® 15-S-40. Surfactants containing silicon atoms can also be used.

E) The Emulsion of an Aminofunctional Polysiloxane

Component E) is an emulsion of an aminofunctional polysiloxane. The polysiloxane in these emulsions is an amino substituted siloxane polymer having terminal silanol (SiOH) groups. The amount of the aminofunctional polysiloxane in the emulsion typically ranges from 15 to 40 weight percent of the total emulsion composition. The aminofunctional polysiloxane is generally stabilized in the aqueous emulsion by means of a cationic and a nonionic surfactant. Typically, such emulsions are prepared by emulsion polymerization techniques involving the ring opening polymerization of cyclosiloxanes in the presences of an amino functional alkoxysilane. As such, when these types of emulsions are broken, the siloxane polymer is no longer stabilized, and it is capable of crosslinking and curing by condensation of the silanol groups. The cationic surfactant in such emulsions is typically a quaternary ammonium salt such as trimethyltallow ammonium chloride. The nonionic surfactant most typically used in preparing such emulsions is an ethoxylated alkyl phenol such as Nonoxynol-10. However, other surfactants can also be used in preparing emulsions of this type.

Although not wishing to be bound by any theory, the present inventors believe the emulsion of the aminofunctional polysiloxane enhances the formation of a resinous coating from components A), B) and C) upon application and drying of the emulsion on a surface. In particular, the aminofunctional polysiloxane present in the emulsion may act as a catalyst to enhance such resin formation upon application and drying.

Cationic emulsions of aminofunctional polysiloxanes are known in the art and are described, for example, in U.S. Pat. No. 4,559,227 (Dec. 17, 1985) and U.S. Pat. No. 5,326,483 (Jul. 5, 1994). Such emulsions are also commercially available. Representative, non-limiting examples of such cationic emulsions of aminofunctional polysiloxanes include; DC 929, DC 939, DC 949, (Dow Corning Corporation, Midland, Mich.), The aqueous silicone emulsions of the present disclosure may contain the following amounts of each component;
- 10-50 wt % of A) the phenyl silsesquioxane resin, alternatively 20 to 45 wt %, alternatively 30 to 45 wt
- 2-15 wt % of B) the alkoxysilane, alternatively 4 to 15 wt %, alternatively 6 to 15 wt %,
- 2-15 wt % of C) the hydroxy terminated polydialkylsiloxane, alternatively 5 to 15 wt %, alternatively 10 to 15 wt %,
- 0.5-10 wt % of D) the emulsifier, alternatively 0.5 to 5 wt %, alternatively 1 to 5 wt %, and
- 1-10 wt % of E) the emulsion of an aminofunctional polysiloxane, alternatively 2 to 10 wt %, alternatively 4 to 8 wt %, and sufficient water to sum to 100 wt % is used in the process.

Typically, the aqueous silicone emulsion will contain at least 60 wt % solids, alternatively, 45 wt solids, or alternatively 30 wt % solids, whereas wt % solids is defined as the summation of all components except water.

The aqueous silicone emulsions of the present disclosure are water continuous emulsions having a dispersed phase of average particle size distribution that is less than 5 micrometers. Typically, the average particle size distribution is less than 2 micrometers.

The aqueous silicone emulsions as described above may be prepared by any techniques known in the art for preparation of water continuous emulsions. Alternatively, the aqueous silicone emulsions may be prepared by a process comprising;
- I) combining
  - A) a phenyl silsesquioxane resin,
  - B) an alkoxysilane,
  - C) a hydroxy terminated polydialkylsiloxane,
  - D) an emulsifier,
  - and water to form a dispersion,
- II) shearing the dispersion to form an emulsion,
- III) admixing
  - E) an emulsion of an aminofunctional polysiloxane to the emulsion.

Components A)-E) and amounts used in this process are the same as described above.

The formation of the dispersion in step (I) involves combining components A), B), C), and D) with water. The order of addition of these components is not critical, but typically components A), B), C), and D) are combined with mixing and then water added to the mixture to form the dispersion. Alternatively, some or all of the emulsifier D) may be combined with some portion of water before mixing with the other components. The amount of each component and water used is generally the total amounts as needed in the final emulsion composition. Typically, the dispersion is formed by mixing the various components by any method known in the art to effect mixing of viscous materials. The mixing may occur either as a batch, semi-continuous, or continuous process. Thus, the mixing may be provided by batch mixing equipments with medium/low shear which include change-can mixers, double-planetary mixers, conical-screw mixers, ribbon blenders, double-arm or sigma-blade mixers. Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments. Furthermore, mixing may occur using emulsification equipments as rotor-stator, colloid mills, homogenizers, and sonolaters.

The temperature and pressure at which the mixing occurs to effect the formation of the dispersion is not critical, but generally is conducted at ambient temperature and pressures. Typically, the temperature of the mixture will increase during the mixing process due to the mechanical energy associated with shearing viscous materials. Thus, lower shear rates will cause less of a temperature increase. Typically, the temperature is controlled to be below 60° C. to minimize undesirable side reactions.

Step II in the process of the present disclosure involves shearing the dispersion resulting from step I to form an emulsion. Shearing may be provided by known techniques and equipment such as rotor-stator, colloid mills, homogenizers, and sonolaters. The formation of the emulsion may be confirmed by any known particle size measurement techniques. Typically, the average particle size of the emulsion formed in step II is less than 5 micrometers, alternatively less than 2 micrometers.

Upon forming the emulsion in step II), component E) is then admixed to the emulsion. The mixing techniques used in step III) is not critical. Typically, simple stirring techniques are sufficient to mix component E) and the emulsion of step II). Alternatively, any of the mixing techniques as described above may be used, providing the mixing does not adversely affect the stability of the emulsion.

Other optional ingredients may be added to the aqueous silicone emulsions of the present disclosure as desired to affect certain performance properties, providing the nature and/or quantity of these optional ingredients does not substantially destabilize the aqueous silicone emulsions. These optional ingredients include, fillers, freeze-thaw additives such as ethylene glycol or propylene glycol, antimicrobial preparations, UV filters, pigments, dyes, and perfumes.

The aqueous silicone emulsions can be used directly to treat various surfaces. In particular, the emulsions of the present disclosure are useful to impart water repellency to various surfaces. The aqueous silicone emulsions having varying percent solids (that is summation of all components except water) can be used as described herein. Alternatively the silicone emulsions can be formulated as a concentrated emulsion having a high solids content for later dilution and direct application to a substrate; or they can be formulated as ready-to-use emulsions with low solids content for direct application to the substrate. The silicone emulsions of the present disclosure may also be added into various water proofing formulations, such as coating and paint formulations.

The actual amount of the silicone emulsion composition employed will vary, depending upon the nature of the substrate being treated, but in general, it should be sufficient to provide the substrate with a coating containing about 2-40 percent by weight of the solids in the water repellent composition being applied.

Substrates generally suitable for treatment with the compositions as disclosed herein include cellulosic surfaces such as wood, fabric, fiber, paper, and paperboard; masonry surfaces such as porous inorganic substrates including concrete, mortar, brick, stone, gypsum, stucco, terra cotta, adobe, plaster, limestone, marble, porcelain, and tile; and concrete building structures.

The method of application of the silicone emulsion or composition containing the silicone emulsion is not critical. Typically it may be applied by topical treatment or topical coating of the substrate using any coating means such as brushing, rolling, or spraying.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Example

Preparation of an Aqueous Silicone Emulsion

In a 4-Liter stainless steel beaker was mixed 760.01 grams of a phenyl silsesquioxane, methoxy terminated resin having the average formula

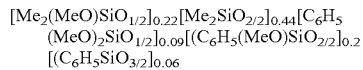

219.98 grams of n-octyltrimethoxysilane, and 208.02 grams of a hydroxyl terminated polydimethylsiloxane having a viscosity of 70 cp. The content was mixed in a Lighting mixer using a dual blade set-up (90 degree 6-bade on bottom, 45 degree 6-bade on top) and a mixing speed of 200 RPM. 34.81 grams of Brij® 30, 42.22 grams of Brij® 35L and 585.99 grams of water were subsequently added to the mixture and the content was mixed for another 30 minutes at 300 RPM. The content was then passed twice through a sonolator (from the Sonic Corporation) with a 0.0005" orifice at 2000 psi. The beginning and ending portions of the emulsion coming out of the sonolator were discarded, and 635.21 grams of a milky white thick emulsion was collected in a beaker. The emulsion was then stirred with the same Lightnin mixer at 150 RPM and was successively added with 0.68 grams of BioBan™ DXN, 41.03 grams of a cationic emulsion containing 35 wt % of an amino functional polysiloxane, and 6.83 grams of propylene glycol. The content was mixed for an additional 15 minutes. The resulting emulsion, contained 60% silicone content, was milky white with a particle size of 0.437 micrometers at the 50 percentile and 1.01 micrometers at the 90 percentile as measured by the Mastersizer (Malvern Instruments Ltd) in the volume mode.

Example 2

Dilution Stability of the Aqueous Silicone Emulsion

A portion of the emulsion of Example 1 was diluted to 5% and another portion to 10% silicone content by diluting at a rate of 1 part of emulsion to approximately 11 parts water (by weight), and 1 part emulsion to 5 parts water (by weight), respectively. For both cases the dilutions were easily mixed using only wrist shaking. These diluted samples and the original emulsion were then subjected to gravitational, freeze/thaw and heat stability tests. The gravitational stability test was performed by placing the emulsion in a 50 mL centrifuge tube and centrifuge in an AccuSpin™ 400 (Fisher Scientific) for 30 minutes at 3000 RPM. Freeze/thaw stability test was performed by placing the emulsion in a closed vial and subject the sample to five temperature cycles according to the following: cool from 23° C. to 5° C. in 2 hrs; cool from 5° C. to −15° C. in 10 hrs; remain at −15° C. for 4 hrs; heat from −15° C. to 5° C. in 4 hrs; heat from 5° C. to 23° C. in 2 hrs; remain at 23° C. for 2 hrs. Heat stability test was performed by placing the emulsion in a closed vial and keep the sample in a 50° C. oven for four weeks. The samples were then visually inspected under sufficient light. The table below summarized the results.

TABLE 1

|  | Gravitational Stability | Freeze/Thaw Stability | Heat Stability |
|---|---|---|---|
| Emulsion of Ex 1. | No settling, no separation, no creaming, no surface oil | No separation, no creaming, trace surface oil | No separation, no creaming, trace surface oil |
| Dilution to 5% Silicone Content | ~3% of the emulsion settled, no separation, no creaming, trace surface oil | No separation, no creaming, trace surface and bottom oil | No separation, no creaming, trace surface oil |
| Dilution to 10% Silicone Content | ~3% settling, no separation, no creaming, trace surface oil | No separation, no creaming, trace surface oil | No separation, no creaming, trace surface oil |

* "trace surface oil" refers to oil patches less than enough to form a monolayer on the surface of the emulsion; it often appears with a colored tint when observed at a certain angle under strong light but is otherwise not noticeable.

Example 3

Preparation of a Silicone Emulsion

A silicone emulsion was made according to the same portions and procedure as in Example 1, except with approximately two times the batch size. The resulting emulsion was milky white with a particle size of 0.38 micro-meters at the 50 percentile and 0.66 micro-meters at the 90 percentile. The calculated VOC of this formulation, in accordance with EPA reference method 24 is 67 inclusive of water and exempt solvents; and 99 g/L exclusive of water and exempt solvents.

Example 4

Performance Testing of a Water Repellent Emulsion on Motor

The emulsion described in Example 3 was diluted to 5% and 10% silicone content by simple addition of water as described in example 2. The appearance of the resultant diluted emulsions was homogeneous and milky white. Standard 2"×2"×2" mortar cubes (prepared per ASTM C109) which were dried to a constant weight, were treated by immersing the cubes in a vessel containing the diluted emulsions for 90 seconds, then the cubes were removed from the vessels and allowed to drain, and then dry for 7 days. Duplicate cubes were treated.

After 7 days cure, the treated cubes and untreated cubes were weighed, then immersed in water such that one inch of water was present above each sample. After 24 hours immersion time, the cubes were removed from the water, drained and lightly blotted to remove liquid water from the surface, then the individual cubes were weighed to determine water absorption. The cubes treated with the dilution sample at 5% silicone content excluded an average 86% of the water absorbed by the control blocks, and the cubes treated with the dilution sample at 10% silicone content excluded an average 88% of the water absorbed by the control cubes.

Example 5

Performance Testing of a Water Repellent Emulsion on Concrete

The emulsion described in Example 3 was diluted to 5% and 10% silicone content by simple addition of water as described in example 2. These diluted emulsions were applied to 3"×5"×⅜" concrete pieces such that one half of the face was treated by immersion in the water repellent mixture, and one half of the face was left untreated. The pieces were removed from the solution after 90 seconds, then allowed to drain, and then dry overnight under normal indoor conditions of approximately 22 degrees C. and approximately 35% relative humidity. Upon examination of the pieces the following day, no apparent line was evident between the treated and untreated portions on the piece treated with the dilution sample at 5% silicone content. On the piece treated with the dilution sample at 10% silicone content, only a slight line or difference between the treated and untreated portions was visible. However, when multiple droplets of water were applied to the pieces, the water soaked in immediately on the untreated portions, but "beaded" (that is, maintained a round droplet shape) where it was applied over the treated portion. Furthermore, when the piece was tipped to approximately 30 degrees, the water droplets on the treated portion ran off of the piece. When droplets were applied such that they ran off of the treated portion on to the untreated portion, they wet the surface and soaked in immediately when they reached the untreated portion.

Example 6

Performance Testing of a Water Repellent Emulsion on Concrete

The concrete pieces as treated in Example 5 were evaluated for water contact angle using a VCA 200.0 Goniometer. Using a microsyringe, a small droplet of water was applied to the surface of the concrete pieces. Utilizing the VCA imaging software, the profile image of the water droplet on the surface was digitally captured and analyzed to determine the angle between water-air interface and the surface-air interface. A contact angle of greater than 90 degrees demonstrates that the surface is highly hydrophobic or water repellent. On average, measuring three separate droplets measured on both sides of the droplet, the contact angle was 141 degrees, which indicated a highly hydrophobic surface.

The invention claimed is:

1. An aqueous silicone emulsion composition comprising;
    10-50 wt % of A) a phenyl silsesquioxane resin,
    2-15 wt % B) an alkoxysilane,
    2-15 wt % C) a hydroxy terminated polydialkylsiloxane comprising the average formula

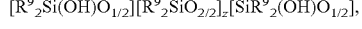

where $R^9$ is an alkyl group having 1-6 carbon atoms and z is greater than one,
    0.5-10 wt % D) an emulsifier, and
    1-10 wt % of E) an emulsion of an aminofunctional polysiloxane, and sufficient water to sum to 100 wt %.

2. The aqueous silicone emulsion composition of claim 1 wherein the phenyl silsesquioxane resin comprises at least 40 mole % of siloxy units having the formula

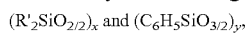

where x and y have a value of 0.05 to 0.95, and
    R' is a monovalent hydrocarbon group having 1 to 8 carbon atoms.

3. The aqueous silicone emulsion composition of claim 1 wherein the alkoxysilane is of the formula $R^8_a Si(OR^9)_{(4-a)}$, where $R^8$ is an alkyl group having 1-30 carbon atoms, $R^9$ is an alkyl group having 1-6 carbon atoms, and the subscript a is 1 or 2.

4. The aqueous silicone emulsion composition of claim 1 wherein the emulsifier is a combination of polyoxyethylene fatty alcohols having a combined HLB of 11-15.

5. The aqueous silicone emulsion composition of claim 1 wherein the emulsion of an aminofunctional polysiloxane is prepared by emulsion polymerization of cyclosiloxanes and an amino functional alkoxy silane.

6. A composition for imparting water repellency to a surface comprising the aqueous silicone emulsion composition of claim 1.

7. A method for imparting water repellency to a surface comprising applying a coating of the aqueous silicone emulsion composition of claim 1 to a surface.

8. The method of claim 7 wherein the surface is an inorganic substrate selected from the group of concrete, mortar, brick, stone, gypsum, stucco, terra cotta, adobe, plaster, limestone, marble, porcelain, and tile.

9. The aqueous silicone emulsion composition of claim 1 wherein the emulsion contains;
    30-45 wt % of A) the phenyl silsesquioxane resin,
    6-15 wt % of B) the alkoxysilane,
    10-15 wt % or C) the hydroxy terminated polydialkylsiloxane,
    1-5 wt % of D) the emulsifier, and
    4-8 wt % of E) the emulsion of an aminofunctional polysiloxane, and sufficient water to sum to 100 wt %.

10. A process for preparing an aqueous silicone emulsion composition, said process comprising;
I) combining
10-50 wt % A) a phenyl silsesquioxane resin,
2-15 wt % B) an alkoxysilane,
2-15 wt % C) a hydroxy terminated polydialkylsiloxane comprising the average formula $$[R^9{}_2Si(OH)O_{1/2}][R^9{}_2SiO_{2/2}]_z[SiR^9{}_2(OH)O_{1/2}],$$

where $R^9$ is an alkyl group having 1-6 carbon atoms and z is greater than one,
0.5-10 wt % D) an emulsifier,
and water to form a dispersion,
II) shearing the dispersion to form an emulsion,
III) admixing
1-10 wt % E) an emulsion of an aminofunctional polysiloxane to the emulsion, and sufficient water to sum to 100 wt % is used in the process.

11. An aqueous silicone emulsion composition prepared according to the process of claim 10.

12. The process of claim 10 wherein
30-45 wt % of A) the phenyl silsesquioxane resin,
6-15 wt % of B) the alkoxysilane,
10-15 wt % of C) the hydroxy terminated polydialkylsiloxane,
1-5 wt % of D) the emulsifier, and
4-8 wt % of E) the emulsion of an aminofunctional polysiloxane, and sufficient water to sum to 100 wt % is used in the process.

* * * * *